(12) United States Patent
Files et al.

(10) Patent No.: US 8,753,012 B2
(45) Date of Patent: Jun. 17, 2014

(54) HIGH STRENGTH PACKAGES AND PACKAGING MATERIALS

(75) Inventors: John C. Files, Vancouver, WA (US); Scott Beckstrom, Vancouver, WA (US)

(73) Assignee: Graphic Flexible Packaging, LLC, Atlanta, GA (US)

( * ) Notice: Subject to any disclaimer, the term of this patent is extended or adjusted under 35 U.S.C. 154(b) by 273 days.

(21) Appl. No.: 12/776,483

(22) Filed: May 10, 2010

(65) Prior Publication Data

US 2010/0270309 A1 Oct. 28, 2010

Related U.S. Application Data

(63) Continuation-in-part of application No. 12/616,371, filed on Nov. 11, 2009, which is a continuation-in-part of application No. 11/824,175, filed on Jun. 28, 2007, now abandoned.

(60) Provisional application No. 60/817,488, filed on Jun. 29, 2006, provisional application No. 61/247,983, filed on Oct. 2, 2009, provisional application No. 61/278,060, filed on Oct. 2, 2009.

(51) Int. Cl.
    *B65D 33/30* (2006.01)
    *B65D 33/10* (2006.01)
    *B65D 30/08* (2006.01)
    *B65D 30/04* (2006.01)

(52) U.S. Cl.
    USPC .............. 383/88; 383/10; 383/116; 383/117; 383/123

(58) Field of Classification Search
    USPC .......... 383/123, 124, 10, 30, 117, 89, 92, 14, 383/88, 85, 83, 7, 109, 114, 116
    See application file for complete search history.

(56) References Cited

U.S. PATENT DOCUMENTS

| | | | |
|---|---|---|---|
| 1,928,758 A | | 10/1933 | Mairson et al. |
| 1,975,404 A | * | 10/1934 | Prucha .............................. 383/40 |
| 2,146,831 A | * | 2/1939 | Maxfield .......................... 53/451 |
| 2,339,304 A | * | 1/1944 | Von Haase ..................... 493/209 |
| 2,941,894 A | | 6/1960 | McAdow |

(Continued)

FOREIGN PATENT DOCUMENTS

| | | |
|---|---|---|
| CA | 2113244 | 1/1994 |
| DE | 1 461 247 | 1/1970 |

(Continued)

OTHER PUBLICATIONS

Machine translation of European Patent Office Document No. 0 743 258. Translated on Sep. 25, 2012.*

(Continued)

*Primary Examiner* — Jes F Pascua
(74) *Attorney, Agent, or Firm* — Womble Carlyle Sandridge & Rice, LLP

(57) ABSTRACT

A package includes at least one closed end including a pair of opposed package panels, each face of the pair of opposed package faces including an interior side and an exterior face, at least one panel comprising a woven polymer material, wherein the interior faces of the package panels are joined to one another to define an interior joined area, the joined panels being folded towards and joined to the exterior face of the package to define a second joined area.

30 Claims, 5 Drawing Sheets

(56) References Cited

U.S. PATENT DOCUMENTS

| | | | |
|---|---|---|---|
| 3,018,189 A | 1/1962 | Traver | |
| 3,196,038 A | 7/1965 | Schoch et al. | |
| 3,364,056 A | 1/1968 | Seibel | |
| 3,394,871 A * | 7/1968 | Williams et al. | 383/44 |
| 3,462,070 A * | 8/1969 | Corella | 206/219 |
| 3,463,659 A | 8/1969 | Dragoon et al. | |
| 3,653,894 A | 4/1972 | Levy et al. | |
| 3,807,626 A | 4/1974 | Goodrich | |
| 3,863,835 A | 2/1975 | Gendron | |
| 3,873,345 A | 3/1975 | Vreeland | |
| 3,910,488 A | 10/1975 | Goodrich | |
| 3,936,383 A | 2/1976 | Daimon et al. | |
| 4,003,311 A | 1/1977 | Bardin | |
| 4,015,085 A | 3/1977 | Wood et al. | |
| 4,072,769 A | 2/1978 | Lidel | |
| 4,166,054 A | 8/1979 | Meeske et al. | |
| 4,173,480 A | 11/1979 | Woodward | |
| 4,173,558 A | 11/1979 | Beck | |
| 4,181,567 A | 1/1980 | Riddell et al. | |
| 4,233,195 A | 11/1980 | Mills | |
| 4,239,519 A | 12/1980 | Beall et al. | |
| 4,265,969 A | 5/1981 | Yasuda et al. | |
| 4,282,059 A | 8/1981 | Davidson | |
| 4,301,210 A | 11/1981 | Yasuda et al. | |
| 4,336,306 A | 6/1982 | Fellows | |
| 4,343,858 A | 8/1982 | Thompson | |
| 4,371,596 A | 2/1983 | Sheibley | |
| 4,373,979 A * | 2/1983 | Planeta | 156/73.1 |
| 4,375,989 A | 3/1983 | Makinen | |
| 4,391,833 A | 7/1983 | Self et al. | |
| 4,401,256 A | 8/1983 | Krieg | |
| 4,410,578 A | 10/1983 | Miller et al. | |
| 4,455,184 A | 6/1984 | Thompson | |
| 4,471,904 A | 9/1984 | Cassidy | |
| 4,490,960 A | 1/1985 | Klemesrud | |
| 4,493,685 A | 1/1985 | Blamer | |
| 4,521,492 A | 6/1985 | Allen | |
| 4,568,574 A | 2/1986 | Allen | |
| 4,587,154 A | 5/1986 | Hotchkiss et al. | |
| 4,595,611 A | 6/1986 | Quick et al. | |
| 4,608,259 A | 8/1986 | Cortopassi | |
| 4,613,542 A | 9/1986 | Alexander | |
| 4,618,992 A | 10/1986 | LaGrotteria | |
| 4,735,308 A | 4/1988 | Barner | |
| 4,739,003 A | 4/1988 | Barr et al. | |
| 4,744,466 A | 5/1988 | Hall | |
| 4,749,444 A | 6/1988 | Lorz et al. | |
| 4,757,930 A | 7/1988 | Ditto | |
| 4,762,643 A | 8/1988 | Bohm et al. | |
| 4,775,586 A | 10/1988 | Bohm et al. | |
| 4,775,771 A | 10/1988 | Pawlowski | |
| 4,781,317 A | 11/1988 | Ditto | |
| 4,786,558 A | 11/1988 | Sumiya et al. | |
| 4,854,971 A | 8/1989 | Gane et al. | |
| 4,865,921 A | 9/1989 | Hollenberg | |
| 4,867,844 A | 9/1989 | Dessauer | |
| 4,868,048 A | 9/1989 | Barr et al. | |
| 4,890,439 A | 1/1990 | Smart | |
| 4,913,773 A | 4/1990 | Knudsen et al. | |
| 4,933,212 A | 6/1990 | Gerstner et al. | |
| 4,935,276 A | 6/1990 | Pawlowski et al. | |
| 4,936,935 A | 6/1990 | Beckett | |
| 4,953,708 A * | 9/1990 | Beer et al. | 383/210.1 |
| 4,954,356 A | 9/1990 | Kappes | |
| 4,963,424 A | 10/1990 | Beckett | |
| 4,982,064 A | 1/1991 | Hartman et al. | |
| 4,984,907 A | 1/1991 | Power | |
| 4,988,561 A | 1/1991 | Wason | |
| 5,015,334 A | 5/1991 | Derrick | |
| 5,023,227 A | 6/1991 | Matoba et al. | |
| 5,029,521 A | 7/1991 | Pav et al. | |
| 5,032,227 A | 7/1991 | Derrick et al. | |
| 5,037,682 A | 8/1991 | Gerstner et al. | |
| 5,041,325 A | 8/1991 | Larson | |
| 5,070,067 A | 12/1991 | Tani et al. | |
| 5,071,512 A | 12/1991 | Bixler et al. | |
| 5,089,320 A | 2/1992 | Straus et al. | |
| 5,091,236 A | 2/1992 | Keller et al. | |
| 5,092,516 A | 3/1992 | Kastanek | |
| 5,093,364 A | 3/1992 | Richards | |
| 5,094,863 A | 3/1992 | Vandenburg | |
| 5,100,934 A | 3/1992 | Glesias | |
| 5,117,078 A | 5/1992 | Beckett | |
| 5,124,519 A | 6/1992 | Roy | |
| 5,128,182 A | 7/1992 | Bunker et al. | |
| 5,143,546 A | 9/1992 | Yuasa et al. | |
| 5,169,496 A | 12/1992 | Wagle et al. | |
| 5,175,031 A | 12/1992 | Ochocki | |
| 5,178,730 A | 1/1993 | Bixler et al. | |
| 5,192,613 A | 3/1993 | Work, III et al. | |
| 5,194,120 A | 3/1993 | Peats et al. | |
| 5,198,490 A | 3/1993 | Berg et al. | |
| 5,199,792 A | 4/1993 | Roosa | |
| 5,213,902 A | 5/1993 | Beckett | |
| 5,221,419 A | 6/1993 | Beckett | |
| 5,223,098 A | 6/1993 | Cluyse et al. | |
| 5,223,311 A | 6/1993 | Tsutsumi et al. | |
| 5,231,068 A | 7/1993 | Miyamoto et al. | |
| 5,240,777 A | 8/1993 | Wacher | |
| 5,252,445 A | 10/1993 | Timmerman et al. | |
| 5,260,537 A | 11/1993 | Beckett | |
| 5,266,386 A | 11/1993 | Beckett | |
| 5,310,587 A | 5/1994 | Alcahori et al. | |
| RE34,683 E | 8/1994 | Maynard | |
| 5,335,996 A | 8/1994 | Cortopassi et al. | |
| 5,340,436 A | 8/1994 | Beckett | |
| 5,346,312 A | 9/1994 | Mabry et al. | |
| 5,354,973 A | 10/1994 | Beckett | |
| 5,360,643 A | 11/1994 | Wacher | |
| 5,376,392 A | 12/1994 | Ikegami et al. | |
| 5,384,295 A | 1/1995 | McWhinnie et al. | |
| 5,385,771 A | 1/1995 | Willetts et al. | |
| 5,399,366 A | 3/1995 | Geddes et al. | |
| 5,407,480 A | 4/1995 | Payton et al. | |
| 5,410,135 A | 4/1995 | Pollart | |
| 5,414,248 A | 5/1995 | Phillips et al. | |
| 5,415,340 A | 5/1995 | Calvert et al. | |
| 5,423,911 A | 6/1995 | Coutelle et al. | |
| 5,424,517 A | 6/1995 | Habeger | |
| 5,429,867 A | 7/1995 | McCarthy et al. | |
| 5,454,955 A | 10/1995 | Albrecht et al. | |
| 5,491,013 A | 2/1996 | Holley | |
| 5,494,738 A | 2/1996 | Van Thillo et al. | |
| 5,519,195 A | 5/1996 | Keefer | |
| 5,552,002 A | 9/1996 | Farrell et al. | |
| 5,603,996 A | 2/1997 | Overcash et al. | |
| 5,609,901 A | 3/1997 | Geddes et al. | |
| 5,628,921 A | 5/1997 | Beckett | |
| 5,632,404 A | 5/1997 | Walsh | |
| 5,672,407 A | 9/1997 | Beckett | |
| 5,728,416 A | 3/1998 | Bono et al. | |
| 5,759,422 A | 6/1998 | Schmelzer | |
| 5,766,732 A | 6/1998 | Claytor | |
| 5,799,978 A | 9/1998 | Grinnell | |
| 5,800,724 A | 9/1998 | Habeger | |
| 5,837,383 A | 11/1998 | Wenzel et al. | |
| 5,868,567 A | 2/1999 | Abe et al. | |
| 5,882,746 A | 3/1999 | Hoffman | |
| 5,928,741 A | 7/1999 | Andersen et al. | |
| 5,935,697 A | 8/1999 | Gasse et al. | |
| 5,989,696 A | 11/1999 | McCarthy et al. | |
| 6,096,384 A | 8/2000 | Calvert | |
| 6,114,679 A | 9/2000 | Lai | |
| 6,120,860 A | 9/2000 | Bowen et al. | |
| 6,150,646 A | 11/2000 | Lai | |
| 6,204,492 B1 | 3/2001 | Zeng | |
| 6,207,242 B1 | 3/2001 | Hoffman | |
| 6,210,776 B1 | 4/2001 | Hill | |
| 6,251,451 B1 | 6/2001 | Zeng | |
| 6,284,034 B1 | 9/2001 | Hiorns et al. | |
| 6,312,742 B1 | 11/2001 | Wood et al. | |
| 6,387,500 B1 | 5/2002 | Behl | |
| 6,414,290 B1 | 7/2002 | Cole | |
| 6,433,322 B2 | 8/2002 | Zeng | |

(56) References Cited

U.S. PATENT DOCUMENTS

| | | |
|---|---|---|
| 6,437,046 B1 | 8/2002 | Morris |
| 6,455,827 B2 | 9/2002 | Zeng |
| 6,534,171 B1 | 3/2003 | Eggers et al. |
| 6,552,315 B2 | 4/2003 | Zeng |
| 6,574,946 B1 | 6/2003 | Linner |
| 6,576,329 B2 * | 6/2003 | Kong .................... 428/213 |
| 6,677,563 B2 | 1/2004 | Lai |
| 6,680,103 B1 | 1/2004 | Sloat et al. |
| 6,717,121 B2 | 4/2004 | Zeng |
| 6,765,182 B2 | 7/2004 | Cole |
| 6,777,067 B1 | 8/2004 | Speith-Herfurth et al. |
| 6,787,205 B1 | 9/2004 | Aho et al. |
| 6,800,051 B2 | 10/2004 | Koehn |
| 6,858,252 B2 | 2/2005 | Sloat et al. |
| 7,291,370 B2 * | 11/2007 | Gipson et al. ............... 428/36.1 |
| 7,635,736 B2 | 12/2009 | Lenges et al. |
| 7,731,425 B2 * | 6/2010 | Lin et al. .................... 383/78 |
| 8,104,959 B2 * | 1/2012 | Lucas et al. ................. 383/10 |
| 8,486,500 B2 * | 7/2013 | Austreng et al. ............ 428/34.3 |
| 2002/0028336 A1 | 3/2002 | Jaccoud |
| 2002/0114933 A1 | 8/2002 | Gould |
| 2002/0132071 A1 | 9/2002 | Buongiorno |
| 2003/0064181 A1 | 4/2003 | Ingraham |
| 2003/0091847 A1 | 5/2003 | Hawes et al. |
| 2003/0166368 A1 | 9/2003 | Bushman et al. |
| 2003/0226648 A1 | 12/2003 | McDonnell et al. |
| 2003/0232161 A1 | 12/2003 | Lin et al. |
| 2004/0016216 A1 | 1/2004 | Romagnoli |
| 2004/0023000 A1 | 2/2004 | Young et al. |
| 2004/0053066 A1 | 3/2004 | Cretekos et al. |
| 2004/0101661 A1 | 5/2004 | Sloat et al. |
| 2004/0105600 A1 | 6/2004 | Floyd |
| 2004/0105941 A1 | 6/2004 | Terada et al. |
| 2004/0175465 A1 | 9/2004 | Buelow et al. |
| 2005/0037162 A1 | 2/2005 | Adams |
| 2005/0084185 A1 | 4/2005 | Moon |
| 2005/0203249 A1 | 9/2005 | Lenges et al. |
| 2005/0272585 A1 | 12/2005 | Allen et al. |
| 2005/0276525 A1 | 12/2005 | Hebert et al. |
| 2006/0014022 A1 | 1/2006 | Kendig et al. |
| 2006/0049190 A1 | 3/2006 | Middleton |
| 2006/0233985 A1 | 10/2006 | Pockat et al. |
| 2006/0269173 A1 * | 11/2006 | Koehn ...................... 383/120 |
| 2007/0140600 A1 * | 6/2007 | Nowak et al. ............... 383/116 |
| 2007/0166512 A1 | 7/2007 | Jesch et al. |
| 2007/0274614 A1 * | 11/2007 | Abel ......................... 383/126 |
| 2007/0292569 A1 | 12/2007 | Bohme et al. |
| 2008/0085065 A1 * | 4/2008 | Nowak et al. ................. 383/7 |
| 2008/0292223 A1 * | 11/2008 | Bannister .................... 383/114 |
| 2010/0098355 A1 * | 4/2010 | Jansen ....................... 383/121 |
| 2010/0120313 A1 | 5/2010 | Bohme et al. |
| 2010/0150479 A1 * | 6/2010 | Smith ....................... 383/61.5 |
| 2010/0263332 A1 | 10/2010 | Files et al. |
| 2010/0273017 A1 | 10/2010 | Files |
| 2010/0273377 A1 | 10/2010 | Files et al. |
| 2011/0013859 A1 * | 1/2011 | Koehn ...................... 383/120 |
| 2011/0230323 A1 | 9/2011 | Robinette et al. |
| 2011/0255807 A1 | 10/2011 | Shapiro et al. |
| 2012/0070105 A1 | 3/2012 | Abel |

FOREIGN PATENT DOCUMENTS

| | | | |
|---|---|---|---|
| EP | 0 271 268 A2 | 6/1988 | |
| EP | 0 313 356 A2 | 4/1989 | |
| EP | 743258 A2 * | 11/1996 | ............ B65D 35/02 |
| EP | 1 092 526 A1 | 4/2001 | |
| GB | 1 083 357 | 9/1967 | |
| GB | 1103466 | 2/1968 | |
| GB | 1 546 607 | 5/1979 | |
| JP | 54-50575 | 4/1979 | |
| JP | 03169540 A | 7/1991 | |
| JP | 04080745 A | 3/1992 | |
| JP | 05-147664 A | 6/1993 | |
| JP | 2001-048126 A | 2/2001 | |
| KR | 2001-0069849 A | 7/2001 | |
| WO | WO 96/15321 A1 | 5/1996 | |
| WO | WO 99/44909 A1 | 9/1999 | |
| WO | WO 00/77300 A1 | 12/2000 | |
| WO | WO 01/05671 A1 | 1/2001 | |
| WO | WO 03/066435 A2 | 8/2003 | |
| WO | WO 2007/002896 A2 | 1/2007 | |
| WO | WO 2008/003025 A2 | 1/2008 | |
| WO | WO 2011/040992 A1 | 4/2011 | |
| WO | WO 2011/040993 A1 | 4/2011 | |
| WO | WO 2011/040994 A1 | 4/2011 | |

OTHER PUBLICATIONS

International Search Report and Written Opinion for PCT/US2010/034179, dated Feb. 1, 2011.
Stonepak, Premier Tech Systems, Model 92-I, 2 pages, Copyright 2009.
Stonepak, Premier Tech Systems, 90-I Pinch Bottom Bag Closer, 2 pages, Copyright 2009.
Stonepak, Premier Tech Systems, Model 92-I Pinch Bottom Bag Sealer/Closer, 2 pages, Apr. 2009.
Stonepak, Premier Tech Systems, 90-I Pinch Bottom Bag Closer, 2 pages, Apr. 2009.
Declaration of John C. Files dated Aug. 30, 2010.
International Search Report and Written Opinion for PCT/US2010/034181, dated Jan. 20, 2011.
International Search Report—PCT/US2007/072329.
U.S. Appl. No. 12/776,468, Response filed Apr. 19, 2012.
U.S. Appl. No. 12/766,468, Office Action mailed Dec. 6 2012.
U.S. Appl. No. 12/776,507, Response filed Sep. 14 2012.
Maier, Clive et al., "Propylene: The Definitive User's Guide and Databook," 1998, Plastics Design Library, pp. 57-58.
Declaration Regarding Prior Art executed by John C. Files on Jan. 22, 2013.
U.S. Appl. No. 12/616,371, Office Action dated Jan. 7, 2013.
U.S. Appl. No. 12/616,371, Response dated Apr. 8, 2013.
U.S. Appl. No. 12/776,468, Response dated Apr. 8, 2013.
U.S. Appl. No. 12/776,494, Office Action dated Feb. 14, 2013.
U.S. Appl. No. 12/776,494, Response dated Apr. 8, 2013.
U.S. Appl. No. 12/776,507, Response dated Jan. 25, 2013.
U.S. Appl. No. 12/776,494 — Office Action dated Aug. 1, 2013.
U.S. Appl. No. 12/776,494—Response dated Nov. 26, 2013.
Written Opinion—PCT/US2007/072329.
International Search Report—PCT/US2006/025557.
Written Opinion—PCT/US2006/025557.
International Search Report—PCT/US2010/034184.
Written Opinion—PCT/US2010/034184.
International Search Report—PCT/US2010/034179.
Written Opinion—PCT/US2010/034179.
U.S. Appl. No. 12/616,371, Office Action mailed Dec. 9, 2011.
U.S. Appl. No. 12/616,371, Response filed Dec. 19, 2011.
U.S. Appl. No. 12/616,371, Office Action mailed Jan. 23, 2012.
U.S. Appl. No. 12/616,371, Response filed Mar. 26, 2012.
U.S. Appl. No. 12/616,371, Office Action mailed Jun. 14, 2012.
U.S. Appl. No. 12/616,371, Response filed Sep. 13, 2012.
U.S. Appl. No. 12/776,468, Office Action mailed Mar. 22, 2012.
U.S.Appl. No. 12/776,468, Response filed Apr. 19, 2012.
U.S. Appl. No. 12/776,468, Office Action mailed Aug. 3, 2012.
U.S. Appl. No. 12/776,468, Response filed Oct. 31, 2012.
U.S. Appl. No. 12/776,468, Office Action mailed Dec. 6, 2012.
U.S. Appl. No. 12/776,507, Office Action mailed May 4, 2012.
U.S. Appl. No. 12/776,507, Response filed May 25, 2012.
U.S. Appl. No. 12/776,507, Office Action mailed Jun. 14, 2012.
U.S. Appl. No. 12/776,507, Response filed Sep. 14, 2012.
U.S. Appl. No. 12/776,507, Office Action mailed Oct. 25, 2012.
Definition of Film, Google Search, www.google.com, Nov. 27, 2012, 3 pages.
Peacock, Andrew J.; *Handbook of Polyethylene: Structures, Properties, and Applications*; 2000; p. 519; Marcel Dekker, Inc.; New York.
U.S. Appl. No. 12/616,371—Non-final Office Action dated Mar. 13, 2014.

* cited by examiner

HIGH STRENGTH PACKAGES AND PACKAGING MATERIALS

CROSS-REFERENCE TO RELATED APPLICATIONS

This application is a continuation-in-part of U.S. patent application Ser. No. 12/616,371, filed Nov. 11, 2009, which is a continuation-in-part of U.S. patent application Ser. No. 11/824,175, filed Jun. 28, 2007, now abandoned, which claims the benefit of U.S. Provisional Application No. 60/817,488, filed Jun. 29, 2006. This application also claims the benefit of U.S. Provisional Application No. 61/247,983, filed Oct. 2, 2009 and of U.S. Provisional Application No. 61/278,060, filed Oct. 2, 2009. Each of the above applications is incorporated by reference in its entirety.

OTHER RELATED APPLICATIONS

This application is related to U.S. patent application Ser. No. 12/776,468, filed May 10, 2010, U.S. patent application Ser. No. 12/776,494, filed May 10, 2010, and U.S. patent application Ser. No. 12/776,507, filed May 10, 2010, each of which is incorporated by reference herein in its entirety.

BACKGROUND

There is a need for high strength, tamper resistant packaging materials for many applications including, for example, pet food, bird seed, grains, controlled environment feeding (e.g., in test laboratories), livestock feed, and so on.

It is known to use woven materials, for example, woven polymeric materials (i.e., polymeric filaments that are woven into a mesh), to impart strength to packaging materials. Such woven materials are typically used in combination with other materials to provide the desired degree of impermeability, strength, stiffness, and other attributes. However, such materials may be difficult to join to other materials and present numerous challenges when being formed into a package.

For example, in traditional packaging formation, the ends of two panels or faces of a tubular structure are typically brought together and joined via adhesive, heat sealing, or otherwise to form a pinch seal. However, in many instances, in particular where a woven polymer layer is used, the area to be joined is quite thick, and therefore, difficult to join without using relatively thick heat seal layers (or a relatively high amount of adhesive material), which, in some instances, may require high heat sealing temperatures. Unfortunately, the application of too much heat can cause the woven polymer to soften and/or distort, thereby compromising the integrity of the structure. Additionally, even where a pinch seal is successfully formed, the seal often tends to be weak, and may fail when the package is being filled. As a result, packages using woven polymer materials are typically sewn or stitched and/or taped at one or both ends to reinforce the seal. However, this process is complicated and costly. Additionally, such processes are prone to issues caused by needle breakage, which may result in contamination of the product with broken needles or needle shards.

To overcome these obstacles, it has been proposed to "step cut" one panel or face of the package (such that one panel or face is longer than the other), and simply fold the longer panel over the shorter panel, as disclosed in U.S. Pat. No. 6,800,051. This generally reduces the thickness of the overlapping areas to be sealed. However, woven materials are generally difficult to cut in this manner without unraveling and forming strings that cause other processing issues.

Thus, there is a need for high strength packaging materials including woven polymeric materials that are capable of being formed into packages. There is also a need for a method of forming a package including woven materials in which a sufficiently strong heat seal can be formed without the need for sewing.

SUMMARY

This application is directed generally to a material for forming packages or other constructs (i.e., a "packaging material"), a method of making the packaging material, a method of forming a package from the material, and packages formed therefrom. The packaging material generally includes a woven polymer substrate and a pair of facing systems on opposite sides of the substrate. Each facing system may include a plurality of layers including, but not limited to, polymer films, polymer or polymeric coatings or layers, paper layers, other woven materials, or any other suitable material. At least a portion of the outermost surface of each facing system may be heat sealable (via application of adhesive, polymer coatings, or otherwise) such that a portion of each facing system can be joined to itself to form a package. As a result, the packaging material can be sealed using a variety of seal types, for example, a pinch seal, a single fold pinch seal (or shear seal, i.e., a combination of a pinch seal and a foldover seal), a double fold pinch seal (or double shear seal), a fin seal, or any other suitable seal. Notably, any of such seals may be made using a straight cut, that is, without the need for a step cut or notched panel that reduces the thickness of the sealed area. The present inventors have discovered that the packaging materials of the present disclosure may be used to form strong bonds that can withstand conventional filling operations without the need for sewing, taping, or other mechanical reinforcement. Thus, the present packaging material provides great flexibility in forming packages.

Although several exemplary packaging materials are disclosed herein, numerous packaging materials are contemplated by this disclosure.

In one example, each facing system generally includes a polymer film layer. One or both of the polymer film layers may be heat sealable for forming the packaging material into a package. The heat sealable layers enable the packaging material to be formed into a variety of packages using different end seals without having the problems commonly associated with sealing packages containing woven polymer layers.

In another example, one facing system of the packaging material includes a polymer film layer that is joined to the substrate, and the other facing system comprises a blend of heat sealable materials, for example, linear low density polyethylene, low density polyethylene, and ethylene/methacrylic acid. The polymer film layer may be heat sealable if desired, or another heat sealable material may overlie the polymer film layer. In one variation of this example, the polymer film layer comprises a polyolefin, for example, biaxially oriented polypropylene. However, numerous other possibilities are contemplated.

In still another example, both facing systems comprise a blend of heat sealable materials, for example, linear low density polyethylene, low density polyethylene, and ethylene/methacrylic acid, or any other suitable material.

The packaging material may be used to form various packages or other constructs. In some instances, the packaging material may be used for packaging a food item that is coated with or contains an oily or greasy substance, for example, a trans fatty acid oil, a low trans fatty acid oil, a non-trans fatty acid oil, a saturated oil, an unsaturated oil, grease, fat, or butter (collectively "oil" or "oils"), that potentially can penetrate one or more components of the packaging material. In some particular examples, the packaging material may be used to form packages or other constructs for containing food items, pet food, bird seed, or any other suitable item. Accordingly, in each of such examples and in any other embodiment contemplated hereby, the facing systems may include numerous other layers or materials, as needed to attain the desired attributes for the packaging material. For example, the packaging material may include one or more oil resistant layers. Additionally or alternatively, the packaging material may include one or more tie layers to improve adhesion (e.g., hot tack and/or seal strength) between various layers. Other applications are contemplated.

Other aspects and features of the present invention will become apparent in view of the figures and the following description.

BRIEF DESCRIPTION OF THE DRAWINGS

The description refers to the accompanying drawings, some of which are schematic, in which like reference characters refer to like parts throughout the several views, and in which:

FIG. 1C is a schematic rear elevation view of the package of FIG. 1B with a shear seal at one end of the package and a double shear seal (i.e., a double fold pinch closure) at the other end of the package;

DESCRIPTION

Various aspects of the invention may be illustrated by referring to the figures, which depict examples of packaging materials and packages formed therefrom. For purposes of simplicity, like numerals may be used to describe like features. Although several different exemplary aspects, implementations, and embodiments of the various inventions are provided, numerous interrelationships between, combinations thereof, and modifications of the various inventions, aspects, implementations, and embodiments are contemplated hereby.

Figure 1A:
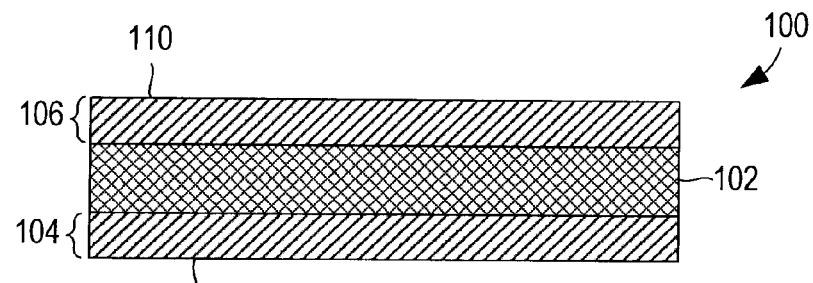
FIG. 1A is a schematic cross-sectional view of an exemplary packaging material according to various aspects of the disclosure.

FIG. 1A schematically illustrates an exemplary material for forming a package (i.e., a packaging material) 100. The packaging material 100 generally includes a woven polymer substrate 102 and a pair of facing systems 104, 106, each of which may include one or more layers that are coextruded and/or otherwise joined to one another. Such layers may include polymer films, polymer or polymeric coatings or layers, paper layers, other woven or nonwoven materials, or any other suitable material. Each facing system 104, 106 of the packaging material 100 includes an outermost surface 108, 110 that respectively defines the inner (i.e., interior) and outer (i.e., exterior) sides or faces 108, 110 of the packaging material 100 (and/or resulting package 112).

Each side 108, 110 of the packaging material 100 includes (or is provided with) at least one area or zone (not shown) that is capable of being joined to the respective same side of the packaging material 100 using a heat sealable material, adhesive, or otherwise. As a result, the packaging material 100 may be formed into numerous packages using various end closures or seals.

Figure 1B:
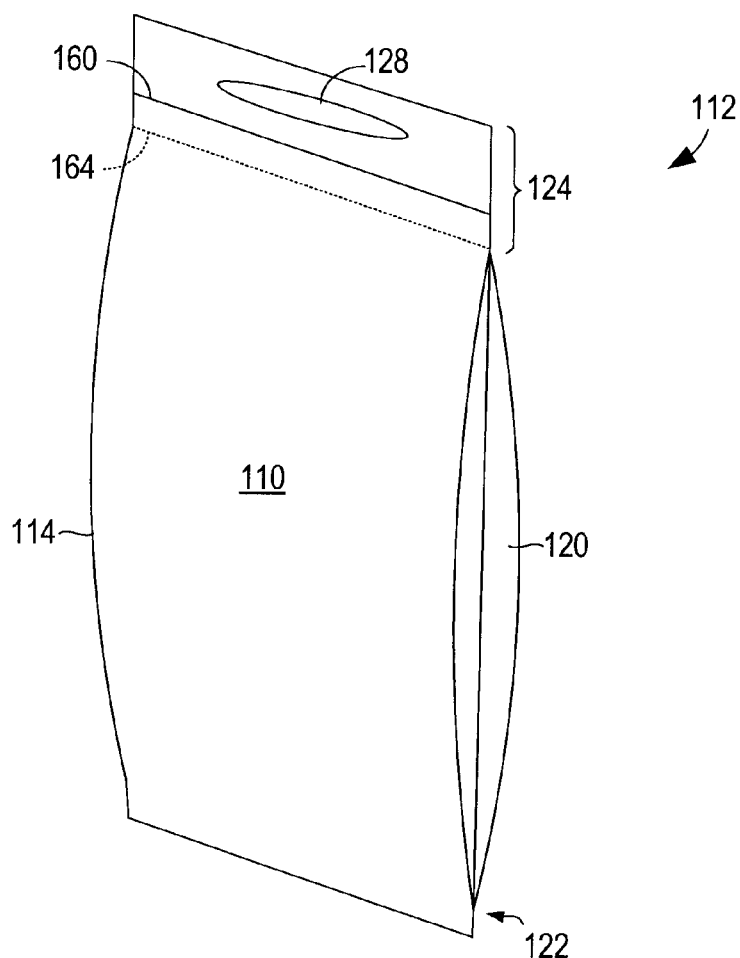
FIG. 1B is a schematic front perspective view of an exemplary package formed from the packaging material of FIG. 1A.

By way of illustration, FIGS. 1B and 1C schematically illustrate a front perspective view (FIG. 1B) and a rear elevation view (FIG. 1C) of an exemplary package 112 formed from the packaging material 100 of FIG. 1A. The package 112 includes a pair of opposed panels or faces 114, 116, a pair of optionally gusseted (i.e., folded or pleated) side panels 118, 120 (shown with dashed lines in FIG. 1C), and a pair of end closures 122, 124. As shown in FIG. 1C, each panel 114, 116, 118, 120 (some of which are hidden from view) and the overall flattened package 112 has a first dimension, for example, a length, extending in a first direction, for example, a longitudinal direction, D1, and a second dimension, for example, a width, extending in a second direction, for example, a transverse direction, D2. The package 112 also may include a longitudinal seal 126 (FIG. 1C), for example, a lap seal or fin seal, extending along the first dimension (e.g., length) of the package 112. The package 112 may further include an integral grasping feature or handle 128 generally comprising an aperture or cutout 128 extending through end closure 124.

Figure 1D:
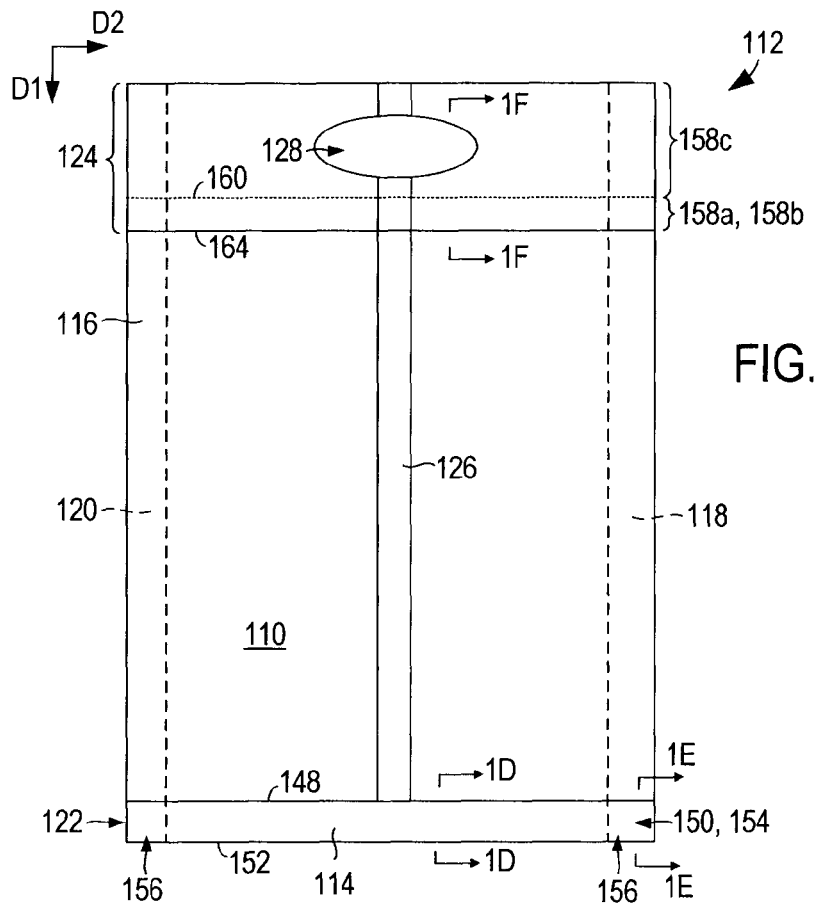
FIG. 1D is a schematic cross-sectional view of a bottom portion of the package of FIG. 1C, taken along line 1D-1D of FIG. 1C.
Figure 1D:
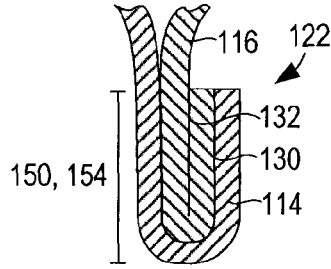
Figure 1E:
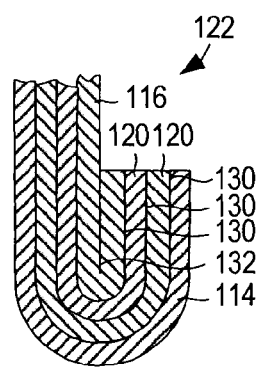
FIG. 1E is a schematic cross-sectional view of a bottom portion of the package of FIG. 1C, taken along line 1E-1E of FIG. 1C.
Figure 1F:
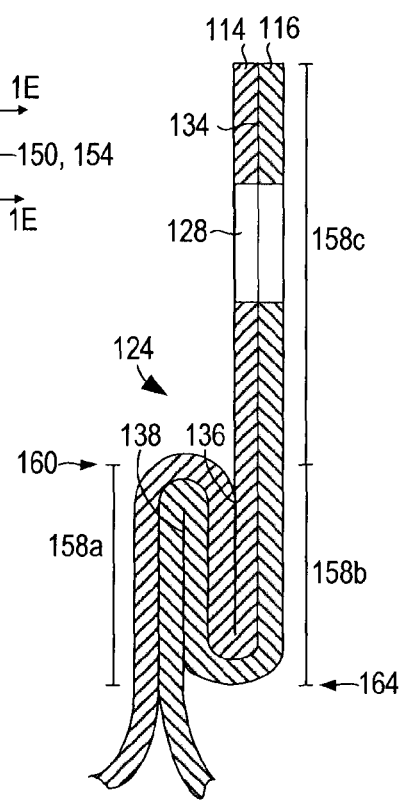
FIG. 1F is a schematic cross-sectional view of a top portion of the package of FIG. 1C, taken along line 1F-1F of FIG. 1C.

Each end closure 122, 124 may comprise a plurality of seals, for example, heat seals, adhesive bonds, or otherwise. More particularly, at least one of the end closures 122, 124 may comprise a shear seal closure (or simply "shear seal") including at least two joined areas or seals, for example, a pinch seal (or fin seal) and a foldover seal, which may, in some embodiments, be in an at least partially overlapping or superposed configuration with one another. For example, as shown in FIGS. 1D and 1E, end closure 122 comprises a shear seal closure including two seals 130, 132 in a superposed configuration, with seal 130 generally comprising a pinch seal (e.g., where two panels are joined together in a facing relationship) and seal 132 generally comprising a foldover seal (e.g., where one portion of the package is folded over and joined to another portion of the package) (sometimes referred to as a "same surface seal" or "same surface foldover seal"). Accordingly, the shear seal closure 122 may be referred to as a "single fold pinch seal closure" or simply "single fold pinch seal". In contrast, end closure 124 includes three seals 134, 136, 138 in an at least partially superposed configuration to define a double shear seal closure or double fold pinch seal closure (or simply "double shear seal" or double fold pinch seal"), with seal 134 comprising a pinch seal and seals 136, 138 comprising foldover seals (FIG. 1F).

The present inventors have discovered that shear seals (or shear seal closures) provide exceptional strength, as compared with other conventional closures or seals. Specifically, the present inventors have determined that the strength of a shear seal is about two orders of magnitude greater than a pinch seal alone. For example, it has been shown that for one particular packaging material, the seal strength of a pinch seal is about 7.4 psi, while the strength of a shear seal formed from the same material is about 75 psi. Thus, a shear seal may be capable of withstanding commercial package forming and filling operations without little or no risk of the end closure failing. This presents a significant advantage over other commercially available packages including a woven polymer substrate 102 (FIG. 1A), where costly and cumbersome step cutting, taping, sewing, or other mechanical fastening processes are needed to ensure that the end closure has sufficient strength to withstand the filling operation. However, it is contemplated that in some embodiments, sewing, taping, or other mechanical fasteners may be used if desired to further strengthen or reinforce the shear seal or other end closure.

Figure 1G:
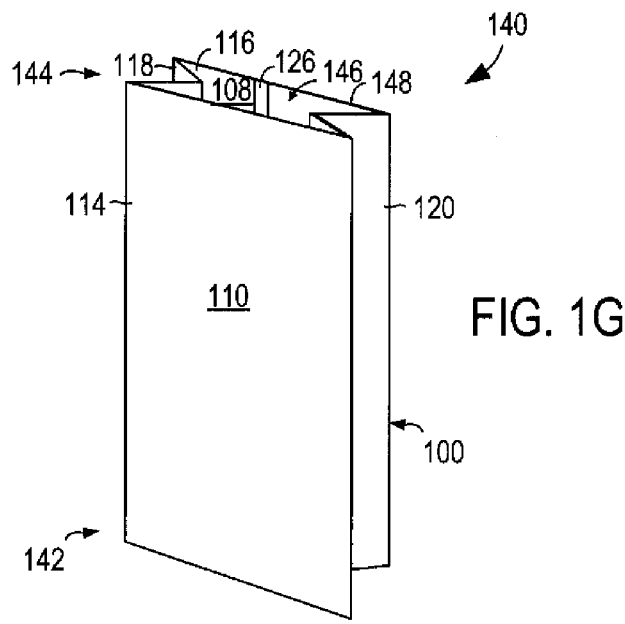
FIG. 1G is a schematic front perspective view of a tubular construct for forming a package, with its right and left side panels folded inwardly.

FIG. 1G schematically illustrates an exemplary construct or structure 140 that may be used to form the package 112 of FIGS. 1B and 1C. The construct 140 comprises a sheet of packaging material 100 configured to have a generally tubular shape with a pair of open ends 142, 144 and an interior space 146. Notably, the edges (generally indicated at 148) of the various panels 114, 116, 118, 120 may be straight cut (e.g., at least substantially straight cut (i.e., not step cut) at one or both ends 142, 144 of the structure 140, as shown in FIG. 1G. In the illustrated embodiment, the packaging material is positioned so that the outermost surface of the first facing system (FIG. 1A) generally defines the interior side 108 of the construct 140 and the outermost surface of the second facing system (FIG. 1A) generally defines the exterior surface 110 of the construct 140. However, it will be appreciated that any other structure for forming a package may be used. Further, it will be appreciated that the present discussion applies to structures having one end sealed or otherwise closed.

The sealed areas 122, 124 may be formed according to various methods. For ease of explanation, the following discussion describes a stepwise formation of the various seals 130, 132, 134, 136, 138. However, it will be appreciated that any of such seals may be formed simultaneously or in any other sequence, for example, as described in U.S. patent application Ser. No. 12/776,507, filed May 10, 2010, which is incorporated by reference herein in its entirety.

Figure 1H:
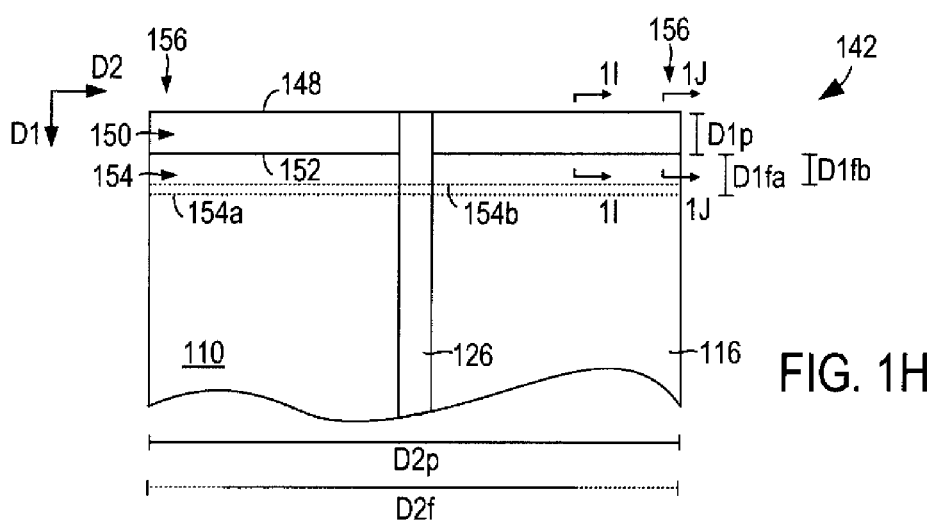
FIG. 1H is a schematic rear elevation view of a first end of the construct of FIG. 1G in a generally flattened configuration, with the end being closed with a pinch seal.
Figure 1I:
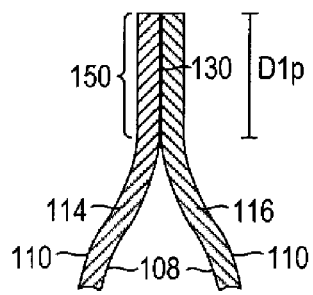
FIG. 1I is a schematic cross-sectional view of a top portion of the construct of FIG. 1H, taken along line 1I-1I of FIG. 1H, with only the cross-section being shown, and with a portion of the interior of the construct being shown.
Figure 1J:
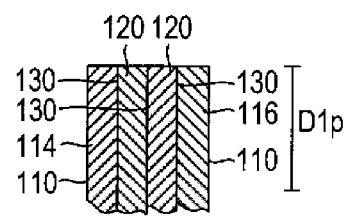
FIG. 1J is a schematic cross-sectional view of a top portion of the construct of FIG. 1H, taken along line 1J-1J of FIG. 1H.

Turning now to FIG. 1H, which schematically depicts one end 142 of the construct 140 in isolation, at least a portion of the interior side 108 of panels 114, 116, 118, 120 may be joined to one another to form a pinch seal 130, as illustrated schematically in FIGS. 1I and 1J. To do so, the interior side 108 of one or more of panels 114, 116, 118, 120 may comprise (or have applied to at least a portion thereof) a heat sealable and/or adhesive material, for example, a heat sealable polymer film, a heat sealable coating, a hot melt adhesive, or any other suitable material for forming an end closure or seal, as needed to create the desired heat seal (e.g., to provide strength, protection from contamination or infestation by insects, and so on).

When exposed to heat, the heat sealable and/or adhesive material is operative for joining the interior faces 108 to one another to form a sealed area 150 (e.g., first sealed area or pinch sealed area or interior sealed area) of the construct 140, as shown schematically in FIG. 1H. In this example, the sealed area 150 generally has a first dimension $D1p$ extending in the first direction between the edge 148 of the panels 114, 116, 118, 120 and a longitudinal seal edge or boundary 152, and a second dimension $D2p$ substantially equal to the second dimension (e.g., width) of the flattened construct 140 (and/or the second dimension of panels 114, 116). However, it will be appreciated that the pinch sealed area 150 may be spaced from the edge 148 of the panels and/or may have other transverse and/or longitudinal dimensions.

The pinch seal 130 may generally be formed at a temperature below the distortion or softening temperature of the woven polymer substrate 102 (FIG. 1A) and/or any other components of the packaging material 100 that are not intended to be softened. For example, where the woven polymer substrate 102 comprises polypropylene, which typically softens at about 350° F., the heat seal temperature for forming the pinch seal 130 may generally be less than about 350° F., for example, from about 250° F. to about 300° F. However, numerous other possibilities are contemplated.

In some embodiments, the heat sealable and/or adhesive material may lie outside of the area 150 to be sealed. For example, all or a portion of the interior surface 108 of the construct 140 may comprise a heat sealable polymer film or polymeric material. In such cases, heat may be applied to the desired seal area 150 to activate (e.g., soften) the heat sealable material in the sealing area 150 and form the desired bond 130 between the interior faces 108 of any of panels 114, 116, 118, 120, as desired.

The foldover seal 132 may then be formed by folding all or a portion of the first dimension $D1p$ of the pinch sealed area 150 towards panel 116 to bring the exterior side 110 of the pinch sealed area 150 into a facing, contacting relationship with another portion (e.g., an adjacent portion 154) of the exterior side of the panel 116. The pinch sealed area 150 may then be joined to panel 116 to form the foldover seal 132 (FIGS. 1D and 1E).

To do so, all or a portion of the area to be sealed 154 may be provided with a heat sealable and/or adhesive material (either on the pinch sealed area 150, the intended sealing area 154 on panel 116, or both), as needed to create the desired bond 132 between the respective areas. The area of the resulting foldover seal generally defines a seal area 154 (e.g., a second seal area or foldover seal area or exterior seal area) at least partially coextensive with the pinch seal area 150 (FIGS. 1C and 1D). For example, when all or substantially all of the first dimension $D1p$ of the pinch sealed area 150 is folded over and joined to panel 116 (for example, where edge 148 is folded over along seal boundary 152 to dashed line 154a), the first dimension $D1fa$ of the foldover seal 132 will be approximately equal to the first dimension $D1p$ of the pinch sealed area 150. When less than the entire first dimension $D1p$ of the pinch sealed area 150 is folded over and joined to panel 116 (for example, where edge 148 is folded over to dashed line 154b), the first dimension $D1fb$ of the foldover seal 132 will be less than the first dimension $D1p$ of the pinch sealed area 150.

The foldover seal 132 may generally be formed at a temperature below the distortion or softening temperature of the woven polymer substrate 102 (FIG. 1A) and/or any other components of the packaging material 100 that are not intended to be heat sealed. For example, where a heat sealable and/or adhesive material overlies the interior surface 108 of one or more of panels 114, 116, 118, 120 in an area adjacent to the area to be foldover sealed (in this example, the interior side 108 of the construct 112 adjacent to exterior sealing area 154, the foldover seal 132 may generally be formed at a temperature below the heat seal temperature of the heat sealable material and/or adhesive on the interior 108 of the respective panel(s) 114, 116, 118, 120. For example, in a stepwise seal formation (with the pinch seal 120 being formed before the foldover seal 132), where the woven polymer substrate 102 comprises polypropylene, which softens at about 350° F., and where the heat seal material on the interior side 108 of the construct 112 heat seals at a temperature of from about 250° F. to about 300° F., the heat seal temperature for forming the foldover seal 132 may generally be less than about 250° F., for example, from about 200° F. to about 225° F. In contrast, where the seals 130, 132 are formed concurrently, the heat seal temperature for forming the foldover seal 132 may be about the same as, less than, or greater than the heat seal temperature of the pinch seal 130, provided that the heat seal temperatures of both seals 130, 132 are less than the softening temperature of the substrate 102.

If needed, ambient or cool air may be directed towards the opposite side of the construct 140 adjacent to the area to be foldover sealed (in this example, towards panel 114 in an area adjacent to sealing area 154) to prevent the interior 108 of the panels 114, 116, 118, 120 from being joined to one another (which would reduce the volume of the interior space 146). However, other possibilities are contemplated.

In some embodiments, the heat sealable and/or adhesive material may lie outside of the area to be sealed 154. For example, all or a portion of the exterior surface 110 of the construct 112 may comprise a heat sealable polymer film or polymeric material or coating. In such cases, heat may be applied to the desired sealing area 154 to activate the heat sealable material in the sealing area 154 and form the desired bond 132, as desired.

It will be noted that in the illustrated embodiment, the pinch seal area 150 is folded over along the seal boundary 152 and joined to an area of the exterior surface 110 directly adjacent to the pinch sealed area 150 (such that the volume of the package is optimized). However, it is contemplated that the pinch seal area 150 may be folded over and joined to the exterior surface 110 of panel 116 at an alternate point, for example, spaced from boundary line 152, if desired.

As stated above, the shear seal closure 122 (formed by combining a pinch seal 130 and a foldover seal 132) provides substantial improvement in strength as compared with a pinch seal alone. Nonetheless, despite their superior strength, packages including a shear seal closure 122 are relatively easy to open. To do so, the user may first peel the pinch sealed area 150 away from the exterior 110 of the package to release the foldover seal 132. The user may then open the pinch seal 130 either by separating panels 114, 116 from one another along the end of the package, or by grasping the panels 114, 116 and pulling them apart distal from the end of the package (such that the pinch seal 130 releases from the interior of the package towards the end of the package). Notably, this sequential opening or unbonding of each seal 130, 132 enables the consumer to access the contents of the package fairly easily, while the combined strength of the seals 130, 132 provides exceptional strength for filling and handling the package 112.

Nonetheless, if desired, additional features may be provided to further facilitate opening of the package. For example, it is contemplated that a portion of the pinch sealed area 150 may remain separate from (i.e., unjoined to or unattached from) the exterior surface 110 of panel 116 (e.g., such that the second dimension D2$f$ of the foldover sealed area 154 may be equal to or less than the second dimension D2$p$ of the pinch sealed area 150, as schematically illustrated with dashed lines in FIG. 1H) to provide a means of grasping the pinch sealed area 150 to facilitate opening the package 112. In one example, the ends 156 of the pinch sealed area 150 may remain unattached from panel 116 so the user may grasp the unattached ends 156 for opening the package in the manner described above. In another example, all or a portion of the edge 148 of the pinch sealed area 150 (formerly the edge 148 of the panels) may remain unjoined. In doing so, a flap or free edge (e.g., a transverse flap or free edge) may be formed to facilitate opening the package.

Figure 1K:
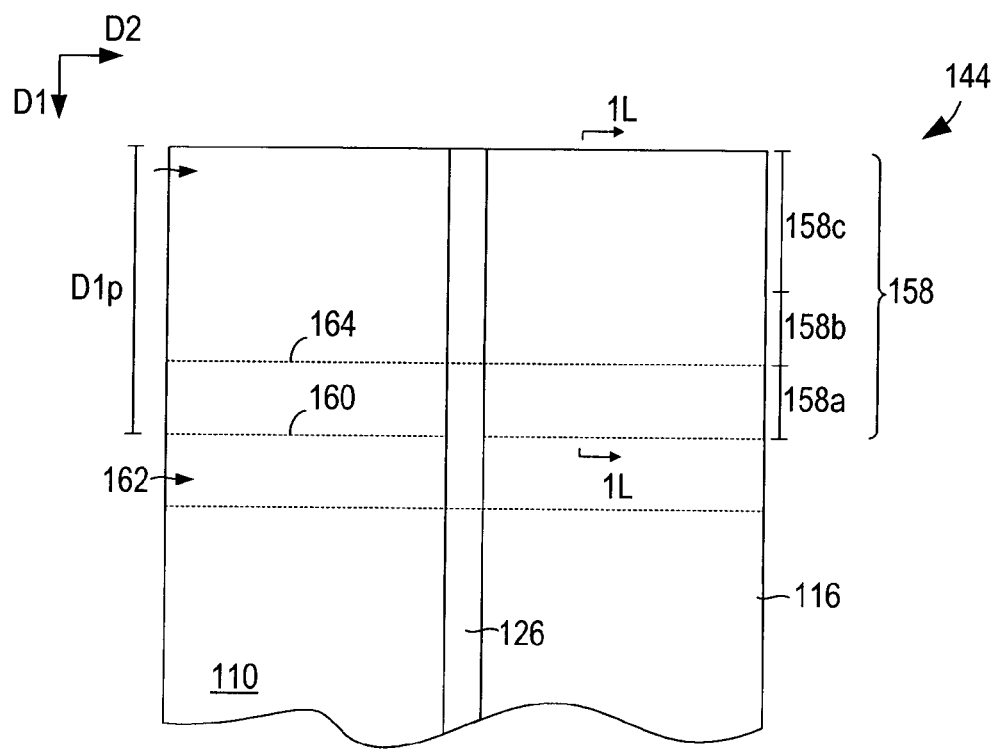
FIG. 1K is a schematic rear elevation view of a second end of the construct of FIG. 1G in a generally flattened configuration, with the end being closed with a pinch seal.
Figure 1L:
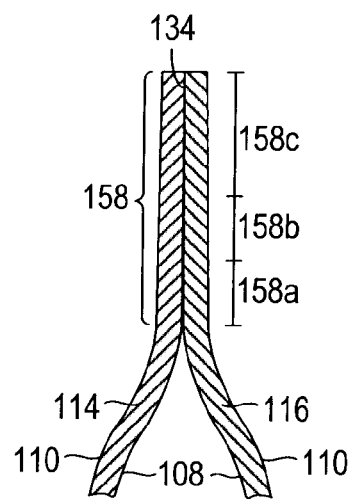
FIG. 1L is a schematic cross-sectional view of a top portion of the construct of FIG. 1K, taken along line 1L-1L of FIG. 1K.

FIG. 1K depicts the opposite end 144 of the structure 140 in isolation, in a generally flatted configuration. To form end closure 124 according to one exemplary method, a pinch seal 134 may be formed between respective portions of the interior sides 108 of panels 114, 116 proximate to the end of the structure 140 to form a pinch sealed area 158 (e.g., first sealed area), as shown in FIG. 1L. A portion 158$a$ of the pinch sealed area 158 may then be folded towards panel 116 along line 160 (shown schematically for ease of explanation), such that the exterior side 110 of panel 116 within the pinch sealed area 158$a$ is brought into a facing, contacting relationship with the adjacent portion 162 of the exterior side 110 of panel 116 (shown schematically with dashed lines in FIG. 1H for ease of explanation). The remaining portions 158$a$, 158$b$ of the pinch sealed area 158 may then be folded away from the exterior side 110 of panel 116 along line 164 (shown schematically with dashed lines in FIG. 1H for ease of explanation), such that the exterior side 110 of panel 114 within the pinch sealed area 158$a$ is brought into a facing, contacting relationship with the adjacent portion 158$b$ of the exterior side 110 of panel 114, as shown in FIG. 1F.

Heat may then be applied to the overlapped areas 158$a$, 158$b$ to form a pair of foldover seals 136, 138 and corresponding foldover sealed areas 158$a$, 158$b$ (e.g., second and third sealed areas). In doing so, lines 160, 164 may become seal boundaries or "fold" lines 160, 164 (FIGS. 1B and 1C) (in which line 164 is hidden from view and shown with a dashed line in FIG. 1B, and line 160 is hidden from view and shown with a dashed line in FIG. 1C).

As discussed above, to form the desired bonds between the panels 114, 116, all or a portion of the areas to be sealed 158$a$, 158$b$ may be provided with a heat sealable and/or adhesive material, as discussed above in connection with end seal 122. Further, if desired, ambient or cool air may be used to prevent the interior 108 of the panels 114, 116 from sealing to one another adjacent to the foldover seal 138, as discussed above.

In this example, the second and third seal areas 158$a$, 158$b$ are in a substantially overlapping, superposed relationship with one another. Additionally, the foldover seals 136, 138 generally have the same first and second dimensions, such that the seal areas 158$a$, 158$b$ are generally coextensive. Further, it will be noted that, in this example, the sealed areas 158$a$, 158$b$ are spaced from the end of the package 112 such that a marginal portion 158$c$ of the pinch sealed area 158 is in a non-superposed relationship with sealed areas 158$a$, 158$b$. However, other possibilities are contemplated. For example, in some embodiments, the marginal portion 158$c$ of the sealed area 158 may be omitted if desired.

If desired, a cutout or aperture 128 may be provided within the end closure 124 to define a handle or other grasping feature for carrying the package 112. The cutout 128 may generally extend through the pinch sealed area 158, and in particular example, the cutout 128 may extend through the pinch sealed area 158c proximate to the end of the package 112. However, in other embodiments, the cutout may also extend through the second and/or third sealed areas. Alternatively still, the pinch sealed area 158 may be spaced from the end of the package 112, and the cutout 128 may extend through an unsealed area. Other possibilities are contemplated. In this example, the cutout 128 is depicted as having a generally oval shape. However, any other suitable shape may be used.

While certain packages are described herein, numerous other package configurations are contemplated. Each package may have any suitable shape and size as needed to contain various contents, and may contain any number and configuration of seals needed for the particular application. For some applications, the bags may include slits or other features that permit the air to escape after filling the bag. This allows a plurality of bags to be packed more efficiently into boxes or other cartons for shipping.

Likewise, countless packaging materials 100 (FIG. 1A) may be used in accordance with the disclosure to form any of the constructs and structures described above, with the substrate 102 and facing systems 104, 106 being selected to impart various properties to the resulting packaging material. By way of illustration, and not limitation, several exemplary packaging materials 200, 300, 400 are illustrated schematically in FIGS. 2-4. Each packaging material 200, 300, 400 generally includes a woven polymer substrate 202, 302, 402 and a respective pair of facing systems 104, 106; 204, 206; 304, 306, each of which may include a plurality of layers, as discussed above in connection with FIG. 1A. For purposes of convenience, some layers of the packaging materials 200, 300, 400 may be described as "overlying" or being disposed "on" other layers. However, it will be appreciated that each packaging material 200, 300, 400 may be inverted, such that other layers may be said to "overlie" or be disposed "on" one another. Accordingly, such terminology is provided merely for convenience of explanation and not limitation in any manner.

It will also be appreciated that numerous other packaging materials are contemplated by the disclosure, and that each of such packaging materials may include various layers. Layers may be added or omitted as needed. It also will be appreciated that various materials may be used to form each layer of the packaging material, and that each layer may have various basis weights or coat weights and may be present in the packaging material in any suitable relative amount, depending on the particular application. Further, it will be appreciated that each layer may serve more than one purpose in a particular packaging material, and that the layer names are provided for convenience of explanation and not limitation in any manner.

Figure 2:
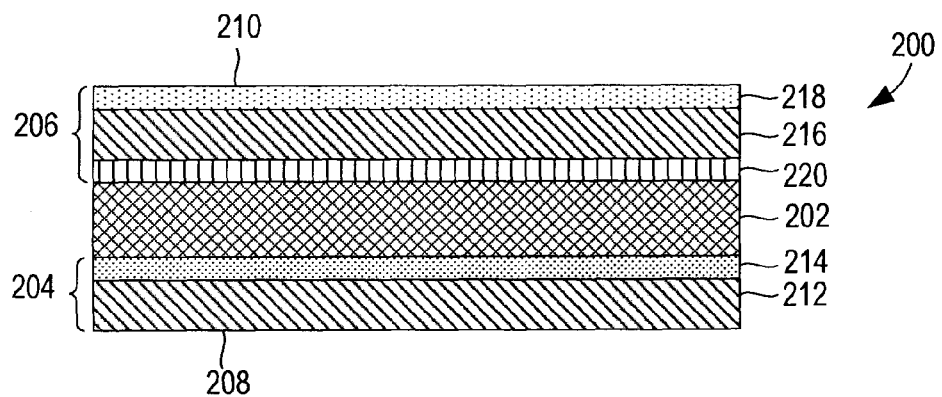
FIG. 2 is a schematic cross-sectional view of an exemplary packaging material in accordance with various aspects of the disclosure.

Turning now to FIG. 2, a first exemplary packaging material 200 includes a woven polymer substrate 202, a first facing system 204 comprising a first polymer film layer 212 and a tie layer (e.g., a first tie layer) 214 disposed between the substrate 202 and the first polymer film layer 212, and a second facing system 206 comprising a second polymer film layer 216, which may be optionally printed with ink 218, and a tie layer (e.g., a second tie layer) 220 disposed between the substrate 202 and the second polymer film layer 216. Each layer 202, 212, 214, 216, 218, 220 is in a substantially facing, contacting relationship with the respective adjacent layer(s). Alternatively, in other embodiments, the second polymer film layer 216 may be reverse printed such that the ink 218 lies between the second polymer film layer 216 and the second tie layer 220.

When used to form a package, the first polymer film layer 212 (i.e., the outermost surface of the first polymer film layer 212) generally faces inwardly and/or defines the interior surface 208 of the package, and the second polymer film layer 216 (i.e., the outermost surface of the second polymer film layer 216 and/or ink 218, where present) generally defines the exterior surface 210 of the package. Accordingly, one or both polymer film layers 212, 216 may comprise heat sealable materials.

The substrate 202 generally comprises a base material from which the packaging material is formed. In one particular embodiment, the substrate 202 may comprise a woven polymer, for example, a woven polypropylene. The substrate 202 may have a denier of from about 500 to about 1600 dpf, for example, from about 600 to about 1200 dpf (denier per filament), for example, from about 700 to 1000 dpf, and in one example, the substrate 202 comprises a woven material having a denier of about 850 dpf. Likewise, the substrate 202 may have any suitable weave, for example, from about 5×5 to about 16×16, for example, from about 8×8 to about 12×12, for example, about 10×10. Other weaves are contemplated, for example, 6×8, 9×15, 15×5, etc. In one particular example, the substrate 202 comprises a woven polypropylene having a denier of about 850 dpf and a 10×10 weave. One example of such a material is commercially available from Mayur Wovens Pvt., Ltd. (India). However, countless other deniers, ranges of deniers, weaves, ranges of weaves, and other substrates may be used.

The first polymer film layer 212 and the second polymer film layer 216 may be used to impart strength, water resistance, heat sealability, and/or other attributes to the packaging material 200. Where heat sealability is desired, one or both polymer films 212, 216 may generally comprise a thermoplastic polymer having a sufficiently low melting or softening point so the heat seal can be initiated at a relatively low temperature ("heat seal temperature"), for example, from about 180° F. to about 300° F. Additionally, the polymer may be selected to provide a wide hot tack sealing window, such that the heat seal may be formed over a range of temperatures with the degree of tackiness for the desired duration.

Examples of suitable polymers may include, for example, polypropylene (PP), for example, biaxially oriented polypropylene (BOPP) (e.g., BEM19 BOPP film, Vifan USA, Inc., Morristown, Tenn.), polyethylene terephthalate (PET), metallized polyethylene terephthalate, low density polyethylene (LDPE), poly(ethylene-co-methacrylic acid) (EMAA) (e.g., Surlyn® films available from DuPont, Wilmington, Del.), or any other suitable material.

The polymer film layers 212, 216 may generally have any suitable thickness (i.e., caliper), for example, from about 0.4 to about 1.5 mil, for example, from about 0.5 to about 1.2 mil. In one example, one or both polymer film layers 212, 216 may have a thickness of about 0.7 mil. In another example, one or both polymer film layers 212, 216 may have a thickness of about 1 mil. However, other suitable thicknesses and ranges of thicknesses are contemplated.

In one particular example, the first polymer film layer 212 may comprise low density polyethylene (LDPE). In one variation of this example, the first polymer film layer 212 may have a thickness of from about 0.5 to about 3 mil, for example, from about 0.8 to about 1.5 mil, for example, about 1 mil. However, other suitable materials are contemplated.

In another particular example, the second polymer film layer 216 may comprise biaxially oriented polypropylene (BOPP). In one variation of this example, the second polymer film layer 216 may have a thickness of from about 0.4 to about 1 mil, for example, from about 0.6 to about 0.8 mil, for example, about 0.7 mil. However, other suitable materials are contemplated.

In still another particular example, the first polymer film layer 212 may comprise LDPE having a thickness of from about 0.8 to about 1.5 mil, for example, about 1 mil, and the second polymer film layer 216 may comprise BOPP having a thickness of from about 0.4 to about 1 mil, for example, about 0.7 mil. However, numerous other configurations of layers are contemplated.

It will be appreciated that in an alternate embodiment, layers 212 and/or 216 may be used to provide strength and/or water resistance, while one or more other layers (not shown) may be provided for heat sealability. Countless possibilities are contemplated.

The tie layers 214, 220 generally serve to join two adjacent layers, but may have additional functionality if desired. In this example, tie layer 214 is generally operative for joining the first polymer film layer 212 and the substrate 202, and tie layer 220 is generally operative for joining the second polymer film layer 216 and the substrate 202.

Each tie layer 214, 220 may have any suitable composition and basis weight needed to attain the desired level of adhesion between the adjacent layers. For example, where the adjacent layers comprise PP (e.g., layers 202, 216), tie layer 220 may comprise PP. Some examples of PPs that may be suitable for use in a tie layer 220 include HMX 340 and HMX 370, both commercially available from Chevron Phillips Chemical Company LLC (The Woodlands, Tex.).

As another example, where the adjacent layers (e.g., layers 202, 212) comprise PP (e.g., layer 202) and LDPE (e.g., layer 212), the tie layer 214 may comprise a blend of polymers. The blend may include one or more components that provide adhesion to the substrate 202 and one or more components that provide adhesion to the first polymer film layer 212.

In one particular example, the blend may comprise a blend of linear low density polyethylene (LLDPE), for example, metallocene catalyzed LLPDE ("m-LLDPE") and LDPE. The present inventors have discovered that this exemplary blend provides superior processability and adhesive properties. One example of an LLDPE that may be suitable for use is Dow Affinity PT 1450G1 (Dow Chemical Co., Midland, Mich.) (believed to be m-LLDPE). While not wishing to be bound by theory, it is believed that Dow Affinity PT 1450G1 LLDPE may include one or more components that may enhance the adhesion with PP. One example of an LDPE that may be suitable is Chevron 1018 LDPE (Chevron Phillips Chemical Co. LLC, The Woodlands, Tex.). Other examples of LDPEs that may be suitable include, but are not limited to, Westlake EC-482 (Westlake Chemical Corp., Houston, Tex.) and Marflex® 1013 LDPE (Phillips Chemical Co. LLC, The Woodlands, Tex.).

The relative amounts of LLDPE (e.g., m-LLDPE) and LDPE in the tie layer 214 may vary for each application. The blend may generally comprise from about 70% to about 95% LLDPE and about 5% to about 30% LDPE (by weight), for example, from about 80% to about 90% LLDPE and about 10% to about 20% LDPE. In one exemplary embodiment, the blend may comprise about 85% LLDPE and about 15% LDPE. However, other suitable amounts and ratios of LDPE and PP may be used.

In other embodiments, the tie layer 214 may comprise a blend of PP and LDPE. Numerous other possibilities are contemplated.

Each tie layer 214, 220 may have any suitable basis weight, for example, from about 1 to about 15 lb/ream, for example, from about 6 to about 10 lb/ream. In one specific example, one of the tie layers 214, 220 has a basis weight of about 8 lb/ream. In another example, both of the tie layers 214, 220 have a basis weight of from about 8 lb/ream. However, other basis weights and ranges of basis weights are contemplated.

To form the packaging material 200 according to one exemplary method, the substrate 202 and polymer film layers 212, 216 may be provided as rolls of materials that can be unwound and brought together. Tie layer 220 may be extruded into a nip between the layers 202, 216 to form an extrusion lamination bond between layers 202, 216. Likewise, tie layer 214 may be extruded into a nip between layers 202, 212 to form an extrusion lamination bond between layers 202, 212. The packaging material 200 may be cooled if needed and wound into a roll.

It will be understood by those of skill in the art that in this and other embodiments, one or more processing additives may be incorporated into any of the various layers as needed or desired. Thus, for example, some such layers or compositions may include surfactants, anti-foaming agents, plasticizers, and additives to modify abrasion resistance and slip. Other additives or components may be selected to improve adhesion to the substrate or to other layers or components within the packaging material, to increase resistance to oil permeation, or to provide other functions or attributes. Examples of such additives include, but are not limited to, cationic primers to enhance bonding, organic or inorganic fillers, for example, talc, calcium carbonate, magnesium carbonate, silica, calcium oxide, alumina, titanium dioxide, any other filler, or any combination thereof. Numerous other possibilities are contemplated hereby.

Figure 3:
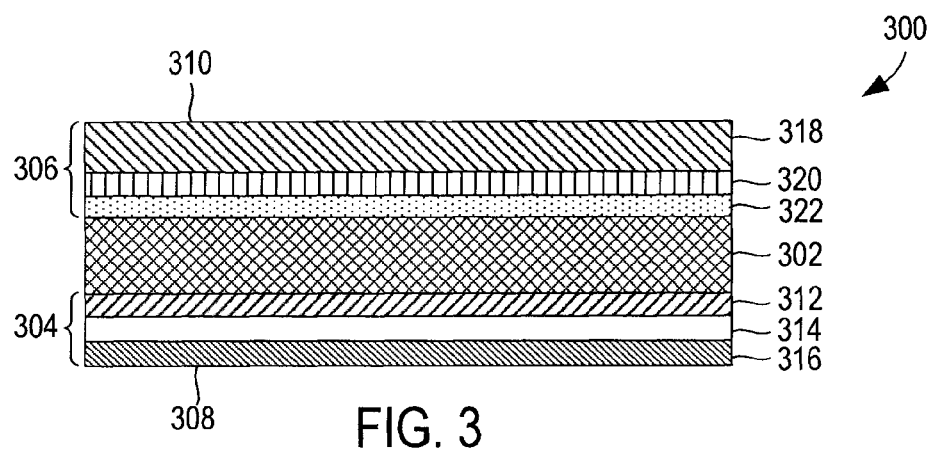
FIG. 3 is a schematic cross-sectional view of another exemplary packaging material in accordance with various aspects of the disclosure.

FIG. 3 schematically illustrates another exemplary packaging material 300. The packaging material 300 includes a substrate 302 including a pair of opposed sides, a first facing system 304 including a tie layer 312 (e.g., a first tie layer), a core layer 314, and a heat seal layer 316 disposed on a first side of the substrate 302, and a second facing system 306 including a polymer film layer 318, which may optionally be printed with an ink 320, and a tie layer 322 (e.g., a second tie layer) disposed on a second side of the substrate 302. In an alternate embodiment (not shown), the polymer film layer 318 may include printing (i.e., ink 320) on the exterior surface 310 of the film 318.

Each layer or material 302, 312, 314, 316, 318, 320, 322 is in a substantially facing, contacting relationship with the respective adjacent layer(s) or material. When used to form a package, polymer film layer 318 (i.e., the outermost surface 310 of polymer film layer 318) generally faces outwardly and/or at least partially defines the exterior surface 310 of the package, and heat seal layer 316 (i.e., the outermost surface 308 of heat seal layer 316) generally faces inwardly and/or defines the interior surface 308 of the package.

The substrate 302 may be any suitable material, for example, the woven polymer materials described in connection with FIG. 2.

Layers 312, 314, 316 generally define a multifunctional polymer system 304. The polymer system 304 may be used to impart numerous properties to the packaging material 300. Thus, while the layers of the polymer system 304 may be described independently, it will be appreciated that the layers cooperate with one another to enhance the packaging material 300, as will be discussed below.

The heat seal layer 316 generally renders the interior side 308 of the packaging material 300 heat sealable. This may be desirable for numerous package configurations. The core layer 314 generally comprises a polymer layer, which may, if desired, impart various attributes to the packaging material 300. By way of example, and not limitation, the core layer 314 may serve as a barrier layer to oils (i.e., as an oil resistant layer). This may be important where the contents of the package include a fatty or oily component, for example, as with pet food, bird seed, etc. The tie layer 312 generally joins the core layer 314 to the substrate 302. However, in some embodiments, the tie layer may be omitted, such that the core layer 314 also serves as a tie layer.

In some instances, the core layer 314 may be selected to have a melting point that is greater than the heat seal temperature to ensure that the integrity of the core layer 314 is maintained during the heat sealing process. In other instances, the core layer 314 may comprise a blend of materials, at least one of which may have a melting point less than the heat seal temperature. In such embodiments, the lower melting component(s) may soften during the heat sealing process, such that a portion of the core layer 314 serves as a heat seal material or layer in conjunction with heat seal layer 316. Thus, depending on the materials selected, each of the various layers 312, 314, 316 may cooperate in various ways to achieve a desired result.

In one exemplary embodiment, the heat seal layer 316 may comprise a blend of low density polyethylene (LLDPE), low density polyethylene (LDPE), and an ethylene/methacrylic acid copolymer (EMA). The LLDPE may be a metallocene LLDPE (m-LLDPE). The ratio of each component may vary for each application. In one example, the blend may comprise from about 60% to 100% LLDPE, from 0 to about 35% LDPE, and from 0 to about 5% EMA. In another example, the blend may comprise from about 60% to about 80% LLDPE, from about 15% to about 35% LDPE, and from about 1 to about 5% EMA. In still another example, the blend may comprise about 60% LLDPE, about 35% LDPE, and about 5% EMA, such that the ratio of the components is about 12:7:1. However, other blends of LLDPE, LDPE, and EMA are contemplated.

The present inventors have found that a blend of LLDPE, LDPE, and EMA offers superior processability and resulting heat seal strength. Specifically, the present inventors have found that by adding LLDPE to LDPE, the melting point (and, therefore, the heat seal temperature) is lowered from about 230° F. to about 220° F., and that by adding EMA to the mixture of LLDPE and LDPE, the melting point (and, therefore, the heat seal temperature) of the blend is lowered to about 210-215° F. As a result, the heat seal may be initiated at a lower temperature, which allows for the packaging material 300 to be heat sealed at greater processing speeds without distorting the woven PP substrate or BOPP film. The present inventors have also found that the heat seal formed from the blend of LLDPE, LDPE, and EMA has superior strength relative to a heat seal formed from any of the individual components.

While various LLPDEs, LDPEs, and EMAs may be used, one example of an LLDPE that may be suitable for use is Dow Affinity PT 1450G1 (Dow Chemical Co., Midland, Mich.) (believed to be m-LLDPE). While not wishing to be bound by theory, it is believed that Dow Affinity PT 1450G1 LLDPE may include one or more components that may enhance the affinity with PP. One example of an LDPE that may be suitable is Chevron 1018 LDPE (Chevron Phillips Chemical Co. LLC, The Woodlands, Tex.). Other examples of LDPEs that may be suitable are set forth above in connection with the discussion of the exemplary packaging material 200 of FIG. 2.

The heat seal layer 316 may have any suitable basis weight, for example, from about 1 to about 5 lb/ream, for example, from about 2 to about 4 lb/ream, for example, about 3 lb/ream. In one specific example, the heat seal layer 316 has a basis weight of about 3.06 lb/ream. However, other basis weights and ranges thereof are contemplated.

The tie layer 312 may be formed from any suitable material that sufficiently adheres to (and therefore joins) the adjacent layers. In one example, the tie layer 312 may comprise a blend of LLDPE, LDPE, and EMA, as described above. The ratio of each component may vary for each application. In one variation, the blend may comprise from about 60% to 100% LLDPE, from 0 to about 35% LDPE, and from 0 to about 5% EMA. In another variation, the blend may comprise from about 60% to about 80% LLDPE, from about 15% to about 35% LDPE, and from about 1 to about 5% EMA. In still another variation, the blend may comprise about 60% LLDPE, about 35% LDPE, and about 5% EMA, such that the ratio of the components is about 12:7:1. Other blends of LLDPE, LDPE, and EMA are contemplated.

The present inventors have discovered that this exemplary blend provides superior processability and adhesive properties with a variety of substrates. By way of illustration, and not limitation, it is known that it is difficult to adhere various polymers layers to polypropylene (PP) (e.g., in the substrate 302) at high processing speeds. However, the exemplary blend of LLDPE, LDPE, and EMA, which has a relatively low melting point (about 210-215° F. as compared with about 350° F. for PP), tends to flow readily into the spaces between the woven filaments, even at high processing speeds (e.g., 2000-2500 ft/min). Additionally, where Dow Affinity 1450G1 LLPDE is used, the present inventors have found that the tie layer 312 has a greater affinity for core layers including PP (e.g., core layer 314), as compared with other LLDPEs. As stated above, while not wishing to be bound by theory, it is believed that the Dow Affinity 1450G1 LLDPE includes one or more components that enhance the affinity of the LLPDE to PP.

The tie layer 312 may have any suitable basis weight, for example, from about 0.5 to about 5 lb/ream, for example, from about 0.75 to about 2 lb/ream, for example, about 1 lb/ream. In one specific example, the tie layer 312 has a basis weight of about 1.19 lb/ream. Other ranges and basis weights are contemplated.

In one exemplary embodiment, the core layer 314 may comprise a blend of PP and LDPE. The relative amounts of PP and LDPE in the core layer 314 may vary for each application. The blend may generally comprise from about 70% to about 90% PP and about 10% to about 30% LDPE. In each of various examples, the blend may comprise about 75% PP and about 25% LDPE, about 80% PP and about 20% LDPE, or about 85% PP and about 15% LDPE. However, other suitable amounts and ratios of LDPE and PP may be used.

The present inventors have discovered these exemplary blends of PP and LDPE in the core layer 314 provide an excellent balance of properties for various packaging materials. For example, as compared with a core layer 314 comprising only PP (i.e., without the LDPE), a core layer 314 including from about 80 to about 85% PP and about 15 to 20% LDPE (by weight) provides about the same level of oil resistance as a core layer 314 comprising 100% PP. Further, the presence of the LDPE improves adhesion with the adjacent layers. By way of example, where the heat seal layer 316 and/or the tie layer 312 comprise a blend of LLDPE, LDPE, and EMA (e.g., as discussed above), the blend of LDPE and PP in the core layer 314 has a greater affinity for the polymer blend of the heat seal layer 316 and/or the tie layer 312, as compared with PP alone.

Further, since LDPE has a lower melting point than PP (about 230° F. for LDPE and about 320° F. for PP), in some cases, depending on the heat seal temperature and other processing conditions, the LDPE in the core layer 314 and the tie layer 312 may soften during the heat sealing process, such that a part of the core layer 314 and tie layer 312 also effectively serves as part of the heat seal layer 316. In such cases, the basis weight of the heat seal layer 316 and/or the tie layer 312 may be reduced, thereby reducing the cost of the overall structure.

By way of illustration, the present inventors have found that a packaging material including:
- a heat seal layer 316 having a basis weight of about 1.3 lb/ream and comprising a blend of about 60% LLDPE, about 35% LDPE, and about 5% EMA (by weight);
- a core layer 314 having a basis weight of about 3.33 lb/ream and comprising an 80/20 blend of PP/LDPE; and
- a tie layer 312 having a basis weight of about 0.37 lb/ream and comprising a blend of about 60% LLDPE, about 35% LDPE, and about 5% EMA, exhibited better peel strength (i.e., layer to layer adhesion) than a packaging material including:
- a heat seal layer 316 having a basis weight of about 3.12 lb/ream and comprising a blend of about 60% LLDPE, about 35% LDPE, and about 5% EMA;
- a core layer 314 having a basis weight of about 4 lb/ream and comprising PP; and
- a tie layer 312 having a basis weight of about 0.88 lb/ream and comprising a blend of about 60% LLDPE, about 35% LDPE, and about 5% EMA.

Thus, although each polymer system 304 had about the same basis weight (about 5 lb/ream), the packaging material including the blend of LDPE and PP in the core layer 314 exhibited superior peel strength at a reduced cost (based on the present cost of various polymers in each layer). While not wishing to be bound by theory, it is believed that this is because the presence of the LDPE in the core layer contributed to the overall heat sealability of the material, as discussed above.

The core layer 314 may generally have a basis weight of from about 1 to about 8 lb/ream, for example, from about 2 to about 6 lb/ream, for example, about 4 lb/ream. In one specific example, the basis weight of the core layer 314 may be about 3.75 lb/ream. Other ranges and basis weights are contemplated.

The polymer system 304 (i.e., the heat seal layer 316, core layer 314, and tie layer 312) may have any suitable total basis weight. In each of various examples, the polymer system 304 may have a basis weight of about 5 lb/ream, about 5.5 lb/ream, about 6 lb/ream, about 6.5 lb/ream, about 7 lb/ream, about 7.5 lb/ream, about 8 lb/ream, about 8.5 lb/ream, about 9 lb/ream, about 9.5 lb/ream, about 10 lb/ream, about 10.5 lb/ream, about 11 lb/ream, about 11.5 lb/ream, about 12 lb/ream, about 12.5 lb/ream, about 13 lb/ream, about 13.5 lb/ream, about 14 lb/ream, about 14.5 lb/ream, about 15 lb/ream, or any other suitable basis weight.

Further, the components of the polymer system 304 may be present in any suitable ratio. In one example, the weight % ratio of the heat seal layer 316, core layer 314, and tie layer 312 may be about 3.06:3.15:1. However, other ratios are contemplated.

In one example, the heat seal layer 316 may have a basis weight of from about 1 to about 5 lb/ream, the core layer 314 may have a basis weight of from about 1 to about 8 lb/ream, and the tie layer 312 may have a basis weight of from about 0.5 to about 5 lb/ream. In another example, the heat seal layer 316 may have a basis weight of from about 2 to about 4 lb/ream, the core layer 314 may have a basis weight of from about 2 to about 6 lb/ream, and the tie layer 312 may have a basis weight of from about 0.75 to about 2 lb/ream. In one particular example, the heat seal layer 316 may have a basis weight of about 3 lb/ream, the core layer 314 may have a basis weight of about 4 lb/ream, and the tie layer 312 may have a basis weight of about 1 lb/ream. In another particular example, the heat seal layer 316 may have a basis weight of about 3.06 lb/ream, the core layer 314 may have a basis weight of about 3.75, and the tie layer 312 may have a basis weight of about 1.19 lb/ream.

The polymer film layer 318 may be used to impart strength, water resistance, heat sealability, and/or other attributes to the packaging material 300. Where heat sealability is desired, the polymer film 318 may generally comprise a thermoplastic polymer having a sufficiently low melting or softening point so the heat seal can be initiated at a relatively low temperature ("heat seal temperature"), for example, from about 180° F. to about 300° F., as discussed above in connection with polymer film layers 212, 216 of FIG. 2. Examples of polymers that may be suitable for the polymer film layer 318 are also discussed in connection with polymer film layers 212, 216 of FIG. 2.

The polymer film layer 318 may have any suitable thickness (i.e., caliper) of, for example, from about 0.4 to about 1.5 mil, for example, from about 0.5 to about 1.2 mil. In one example, the film may have a thickness of about 0.7 mil. However, other suitable thicknesses and ranges of thicknesses are contemplated.

In one particular example, the polymer film layer 318 may comprise biaxially oriented polypropylene (BOPP). In one variation of this example, the polymer film layer 318 may have a thickness of from about 0.4 to about 1 mil, for example, from about 0.6 to about 0.8 mil. In one variation of this example, the polymer film layer 318 may have a thickness of about 0.7 mil. However, other suitable materials are contemplated.

The tie layer 322 generally serves to join the two adjacent layers, in this example, the polymer film layer 318 and the substrate 302, but may provide functionality if desired. The tie layer 322 may have any suitable composition and basis weight as needed to attain the desired level of adhesion between the adjacent layers. In one particular example, the blend may comprise a blend of linear low density polyethylene (LLDPE), for example, metallocene catalyzed LLPDE ("m-LLDPE") and LDPE. The present inventors have discovered that this exemplary blend provides superior processability and adhesive properties. One example of an LLDPE that may be suitable for use is Dow Affinity PT 1450G1 (Dow Chemical Co., Midland, Mich.) (believed to be m-LLDPE). While not wishing to be bound by theory, it is believed that Dow Affinity PT 1450G1 LLDPE may include one or more components that may enhance the adhesion with PP. One example of an LDPE that may be suitable is Chevron 1018 LDPE (Chevron Phillips Chemical Co. LLC, The Woodlands, Tex.). Other examples of LDPEs that may be suitable include, but are not limited to, Westlake EC-482 (Westlake Chemical Corp., Houston, Tex.) and Marfiex® 1013 LDPE (Phillips Chemical Co. LLC, The Woodlands, Tex.). However, numerous other possible tie layers are contemplated.

The relative amounts of LLDPE (e.g., m-LLDPE) and LDPE in the tie layer 322 may vary for each application. The blend may generally comprise from about 70% to about 95% LLDPE and about 5% to about 30% LDPE (by weight), for example, from about 80% to about 90% LLDPE and about 10% to about 20% LDPE. In one exemplary embodiment, the blend may comprise about 85% LLDPE and about 15% LDPE. However, other suitable amounts and ratios of LDPE and PP may be used.

The tie layer 322 may have any suitable basis weight, for example, from about 1 to about 15 lb/ream, for example, from about 6 to about 10 lb/ream. In one specific example, the tie layer 322 has a basis weight of about 8 lb/ream. However, other basis weights and ranges of basis weights are contemplated.

To form the packaging material 300 according to one exemplary method, layers 312, 314, 316 may be extruded (individually or coextruded) onto the first side of the substrate 302. Polymer film layer 318 may be unwound and brought into a facing relationship with the second side of the substrate 302. The tie layer 322 may be extruded into a nip between the layers 302, 318 to form an extrusion lamination bond between layers 302, 318. However, numerous other steps and sequences of steps are contemplated. In any of such scenarios, one or more of the layers may be coextruded or may be formed and/or joined in a sequential manner. The packaging material 300 may be cooled if needed and wound into a roll.

Figure 4:
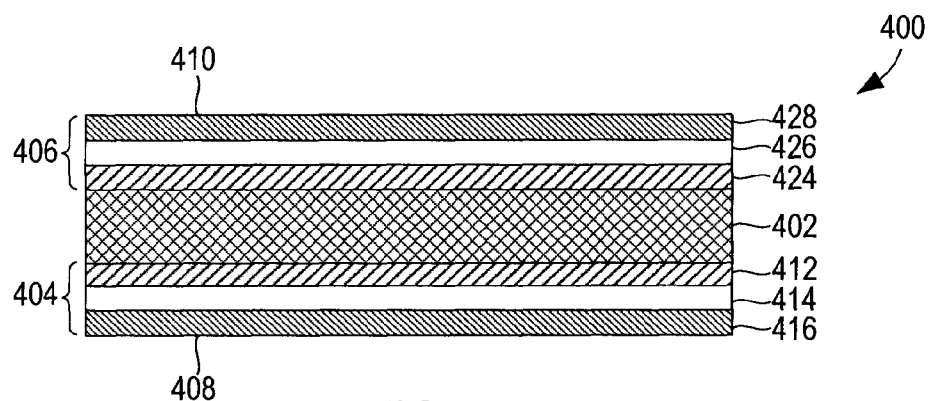
FIG. 4 is a schematic cross-sectional view of still another exemplary packaging material in accordance with various aspects of the disclosure.

FIG. 4 schematically illustrates an alternate packaging material 400. The packaging material 400 includes features that are similar to the packaging material 300 of FIG. 3, except for variations noted and variations that will be understood by those of skill in the art. For simplicity, the reference numerals of similar features are preceded in the figures with a "4" instead of a "3".

In this example, layers 318, 320, 322 of the packaging material 300 of FIG. 3 are replaced with a polymer system 406 similar to that of polymer system 404. Specifically, the packaging material 400 includes a substrate 402 including a pair of opposed sides, a first tie layer 412, a first core layer 414, and a first heat seal layer 416 disposed on a first side of the substrate 402, and a second tie layer 424, a second core layer 426, and a second heat seal layer 428 disposed on a second side of the substrate 402, such that the arrangement of layers is generally symmetrical. If desired, the outermost surface 408, 410 of layers 416 and/or 428 may be printed with ink (not shown).

Each pair of layers (e.g., the first and second heat seal layers 416, 418, the first and second core layers 414, 426, and the first and second tie layers 412, 424) independently may have the same or different composition and/or weight. Exemplary basis weights are provided above with respect to the packaging material 300 of FIG. 3.

As with the packaging material 300 of FIG. 3, either or both of layers 412, 424 may be omitted, such that layers 414, 426 serve as tie layers that join the heat seal layers 416, 428 to the respective sides of the substrate 402.

While numerous possibilities are contemplated, this packaging material 400 may find particular use where less strength is needed and/or where a lower cost alternative is desired.

In still another exemplary embodiment (not shown), one or both of the facing systems may comprise a layer of paper that defines the first and/or second surface of the packaging material. It will be appreciated that shear seals and/or other seals may be formed from such materials using a hot melt adhesive or other adhesive material. Numerous other possibilities are contemplated.

Various aspects of the present invention are illustrated further by the following example, which is not to be construed as limiting in any manner.

Example

A packaging material having the following structure was made by extrusion laminating the polymer film layers to the woven substrate:
  about 0.7 mil BOPP film;
  about 8 lb/ream PP;
  about 850 dpf 10×10 woven PP substrate;
  about 8 lb/ream blend of 80% Dow Affinity m-LLDPE+ 20% LDPE;
  about 1 mil LDPE film Various properties of the packaging material were measured. The results are set forth in Table 1, in which all values are approximate.

TABLE 1

| | |
|---|---|
| Weight (lb/ream) | 66.2 |
| Caliper (mils) | 7.69 |
| Grease resistance | No grease penetration |
| Oxygen transmission rate (OTR) (cc/m$^2$/day) | 16.01 |
| Water vapor transmission rate (WVTR) (100 g/m$^2$/day) | 0.105 |
| Puncture (g) | Would not puncture |
| Gurley stiffness, MD | 132.6 |
| Gurley stiffness, CD | 137.9 |
| Tear, MD (g) | Would not tear |
| Tear, CD (g) | Would not tear |
| Tensile, MD (lb/in) | Would not break |
| Tensile, CD (lb/in) | Would not break |

Although certain embodiments of this invention have been described with a certain degree of particularity, those skilled in the art could make numerous alterations to the disclosed embodiments without departing from the spirit or scope of this invention. All directional references (e.g., upper, lower, upward, downward, left, right, leftward, rightward, top, bottom, above, below, vertical, horizontal, clockwise, and counterclockwise) are used only for identification purposes to aid the reader's understanding of the various embodiments of the present invention, and do not create limitations, particularly as to the position, orientation, or use of the invention unless specifically set forth in the claims. Joinder references (e.g., joined, attached, coupled, connected, and the like) are to be construed broadly and may include intermediate members between a connection of elements and relative movement between elements. As such, joinder references do not necessarily imply that two elements are connected directly and in fixed relation to each other.

It will be recognized by those skilled in the art, that various elements discussed with reference to the various embodiments may be interchanged to create entirely new embodiments coming within the scope of the present invention. It is intended that all matter contained in the above description or shown in the accompanying drawings shall be interpreted as illustrative only and not limiting. Changes in detail or structure may be made without departing from the spirit of the invention. The detailed description set forth herein is not intended nor is to be construed to limit the present invention or otherwise to exclude any such other embodiments, adaptations, variations, modifications, and equivalent arrangements of the present invention.

Accordingly, it will be readily understood by those persons skilled in the art that, in view of the above detailed description of the invention, the present invention is susceptible of broad utility and application. Many adaptations of the present invention other than those herein described, as well as many variations, modifications, and equivalent arrangements will be apparent from or reasonably suggested by the present invention and the above detailed description thereof, without departing from the substance or scope of the present invention.

While the present invention is described herein in detail in relation to specific aspects, it is to be understood that this detailed description is only illustrative and exemplary of the present invention and is made merely for purposes of providing a full and enabling disclosure of the present invention and to set forth the best mode of practicing the invention known to the inventors at the time the invention was made. The detailed description set forth herein is not intended nor is to be construed to limit the present invention or otherwise to exclude any such other embodiments, adaptations, variations, modifications, and equivalent arrangements of the present invention.

What is claimed is:

1. A package comprising:
a packaging material comprising a laminate, the laminate comprising a woven polymer substrate having opposite first and second faces, a first heat seal layer mounted to the first face of the substrate, and a second heat seal layer mounted to the second face of the substrate;
the packaging material being configured as a tubular structure so that a first panel of the packaging material and a second panel of the packaging material are in an opposed, facing relationship with one another, the first panel and the second panel each having an interior side, an exterior side, and an end edge, wherein the woven polymer substrate is positioned at least along the respective end edge of the first panel or the second panel;
at least one sealed closed end of the tubular structure, the sealed closed end comprising
a first sealed area comprising a portion of the first heat seal layer of the interior side of the first panel and a portion of the first heat seal layer of the interior side of the second panel being heat sealed to one another in a facing, contacting relationship with each other; and
a second sealed area comprising at least a portion of the first sealed area folded over and heat sealed to the exterior side of the first panel, such that a portion of the second heat seal layer of the exterior side of the first panel of the first sealed area and an adjacent portion of the second heat seal layer of the exterior side of the first panel are heat sealed to one another in a facing, contacting relationship with each other; and
the woven polymer substrate having a softening temperature at which the woven polymer substrate will soften, and each of the first and second heat seal layers having a heat seal temperature that is lower than the softening temperature of the woven polymer substrate,
wherein
the woven polymer substrate comprises woven polypropylene,
the first heat seal layer comprises low density polyethylene,
the first heat seal layer being mounted to the first face of the substrate comprises a tie layer of the laminate being positioned between the first heat seal layer and the first face of the substrate,
the tie layer comprises a polymer blend comprising linear low density polyethylene and low density polyethylene, and
the polymer blend includes more of the linear low density polyethylene than the low density polyethylene.

2. The package of claim 1, wherein the first sealed area and the second sealed area are in an at least partially superposed configuration.

3. The package of claim 1, wherein the first sealed area and the second sealed area each comprise the end edge of each of the first panel and the second panel.

4. The package of claim 1, wherein the first sealed area comprises a pinch seal.

5. The package of claim 1, wherein the second sealed area comprises a foldover seal.

6. The package of claim 1, wherein
the first sealed area and the second sealed area each have a first dimension extending along the length of the package and a second dimension extending along the width of the package, and
the first dimension of the first sealed area is substantially the same as the first dimension of the second sealed area.

7. The package of claim 1, wherein
the first sealed area and the second sealed area each have a first dimension extending along the length of the package and a second dimension extending along the width of the package, and
the first dimension of the first sealed area is greater than the first dimension of the second sealed area.

8. The package of claim 1, wherein
the first sealed area and the second sealed area each have a first dimension extending along the length of the package and a second dimension extending along the width of the package, and
the second dimension of the first sealed area is greater than the second dimension of the second sealed area.

9. The package of claim 1, further comprising a third sealed area, the third sealed area comprising the second sealed area folded over and joined to the second panel such that the exterior side of the second panel of the second sealed area is in a facing, contacting relationship with another portion of the exterior side of the second panel.

10. The package of claim 9, wherein the second sealed area and the third sealed area are in an at least partially superposed relationship with one another.

11. The package of claim 10, wherein
the second sealed area and the third sealed area each have a first dimension extending along the length of the package and a second dimension extending along the width of the package, and
the first dimension of the second sealed area is substantially the same as the first dimension of the third sealed area.

12. The package of claim 11, wherein
the first sealed area has a first dimension extending along the length of the package and a second dimension extending along the width of the package, and
the first dimension of first sealed area is greater than the respective first dimensions of the second sealed area and the third sealed area.

13. The package of claim 12, wherein the first sealed area includes a marginal area of the package proximate to the end of the package.

14. The package of claim 12, wherein the second sealed area and the third sealed area are spaced from the end of the package.

15. The package of claim 13, wherein the first sealed area comprises a cutout.

16. The package of claim 1, wherein:
the tie layer is a first tie layer, the laminate further comprises a second tie layer; and the second heat seal layer being mounted to the second face of the substrate comprises the second tie layer being positioned between the second heat seal layer and the second face of the substrate.

17. The package of claim 1, wherein the woven polymer substrate has a softening temperature of about 350 degrees Fahrenheit.

18. The package of claim 1, wherein the heat seal temperature of each of the first and second heat seal layers is less than about 350 degrees Fahrenheit.

19. The package of claim 1, wherein the heat seal temperature of each of the first and second heat seal layers is in a range from about 250 degrees Fahrenheit to about 300 degrees Fahrenheit.

20. The package of claim 19, wherein the woven polymer substrate has a softening temperature of about 350 degrees Fahrenheit.

21. The package of claim 1, wherein individual filaments of the woven polypropylene have a denier of from about 500 to about 1600.

22. The package of claim 1, wherein for each heat seal layer of the first heat seal layer and the second heat seal layer, the heat seal layer:
   comprises a thermoplastic polymer; and
   has a thickness from about 0.4 mil to about 1.5 mil.

23. The package of claim 1, wherein the first heat seal layer comprises a polymer blend comprising:
   the linear low density polyethylene of the first heat seal layer,
   low density polyethylene and
   an ethylene methacrylic acid copolymer.

24. The package of claim 1, wherein:
   the low density polyethylene of the first heat seal layer is linear low density polyethylene; and
   the polymer blend further comprises an ethylene methacrylic acid copolymer.

25. The package of claim 1, wherein the end edge of the first panel and the end edge of the second panel are substantially straight.

26. A package comprising:
   a packaging material comprising a laminate, the laminate comprising a woven polymer substrate having opposite first and second faces, a first heat seal layer mounted to the first face of the substrate, and a second heat seal layer mounted to the second face of the substrate;
   the packaging material being configured as a tubular structure so that a first panel of the packaging material and a second panel of the packaging material are in an opposed, facing relationship with one another, the first panel and the second panel each having an interior side, an exterior side, and an end edge, wherein the woven polymer substrate is positioned at least along the respective end edge of the first panel or the second panel;
   at least one sealed closed end of the tubular structure, the sealed closed end comprising
      a first sealed area comprising a portion of the first heat seal layer of the interior side of the first panel and a portion of the first heat seal layer of the interior side of the second panel being heat sealed to one another in a facing, contacting relationship with each other; and
      a second sealed area comprising at least a portion of the first sealed area folded over and heat sealed to the exterior side of the first panel, such that a portion of the second heat seal layer of the exterior side of the first panel of the first sealed area and an adjacent portion of the second heat seal layer of the exterior side of the first panel are heat sealed to one another in a facing, contacting relationship with each other; and
   the woven polymer substrate having a softening temperature at which the woven polymer substrate will soften, and each of the first and second heat seal layers having a heat seal temperature that is lower than the softening temperature of the woven polymer substrate,
   wherein
      the woven polymer substrate comprises woven polypropylene,
      the first heat seal layer comprises linear low density polyethylene,
      the first heat seal layer being mounted to the first face of the substrate comprises a tie layer of the laminate being positioned between the first heat seal layer and the first face of the substrate,
      the tie layer comprises a polymer blend comprising linear low density polyethylene, low density polyethylene and an ethylene methacrylic acid copolymer,
      the laminate further comprises a core layer positioned between the first heat seal layer and the tie layer,
      the core layer comprises polypropylene and low density polyethylene, and
      the core layer includes more of the polypropylene than the low density polyethylene.

27. The package of claim 26, wherein:
the tie layer is a first tie layer,
the laminate further comprises a second tie layer; and
the second heat seal layer being mounted to the second face of the substrate comprises the second tie layer being positioned between the second heat seal layer and the second face of the substrate.

28. The package of claim 26, wherein the polymer blend includes more of the linear low density polyethylene than the low density polyethylene.

29. The package of claim 26, wherein the end edge of the first panel and the end edge of the second panel are substantially straight.

30. The package of claim 29, wherein:
the tie layer is a first tie layer,
the laminate further comprises a second tie layer; and
the second heat seal layer being mounted to the second face of the substrate comprises the second tie layer being positioned between the second heat seal layer and the second face of the substrate.

* * * * *